United States Patent [19]

Cunningham et al.

[11] Patent Number: 4,466,749
[45] Date of Patent: Aug. 21, 1984

[54] MICROPROCESSOR CONTROLLED THERMOCOUPLE SIMULATOR SYSTEM

[75] Inventors: Karl E. Cunningham, El Cajon; Michael F. Wells, Poway, both of Calif.

[73] Assignee: Ectron Corporation, San Diego, Calif.

[21] Appl. No.: 368,891

[22] Filed: Apr. 15, 1982

[51] Int. Cl.$^3$ .................... G01K 7/14; H03K 13/02
[52] U.S. Cl. ............................... 374/134; 364/557; 364/578; 374/170; 374/179
[58] Field of Search .............. 374/134, 170; 364/578, 364/571, 557, 578

[56] References Cited

U.S. PATENT DOCUMENTS

| | | | |
|---|---|---|---|
| 2,876,417 | 3/1959 | Winram | 324/76 |
| 2,886,776 | 5/1959 | Knudsen | 324/73 |
| 3,142,798 | 7/1964 | Schwarz | 324/74 |
| 3,504,522 | 4/1970 | Jasik et al. | 73/1 R |

OTHER PUBLICATIONS

"Instruction Manual Model 1100 Thermocouple Simulator/Calibrator", Ectron Corp., Revised 5/79, pp. 1-46 with Schematics.

Primary Examiner—Daniel M. Yasich
Attorney, Agent, or Firm—Brown & Martin

[57] ABSTRACT

A thermocouple simulator system which is capable of generating a voltage equivalent to the EMF output of a thermocouple of a selected type at a specified sensing junction temperature. The system includes a keyboard which allows an operator to specify a sensing junction temperature, voltage, thermocouple type, reference junction temperature, and whether a pair of output terminals of the system perform as thermocouple alloy or copper. Using an operation program, a microprocessor calculates the thermocouple EMF using a stored temperature versus EMF polynomial function of the selected thermocouple type. The microprocessor then causes a voltage simulating the calculated EMF to be applied to the output terminals utilizing a reference voltage source, digital-to-analog converter (DAC), and output amplifier. When the wires connected to the output terminals are made of a different metal than the terminals, signals from temperature sensors in the output terminals are fed to the microprocessor through an analog-to-digital converter. The microprocessor then offsets the voltage simulating the EMF output to compensate for the thermocouple junction formed in connecting the wires to the output terminals. The system may also operate as a precision DC power supply with extremely low output impedance.

11 Claims, 10 Drawing Figures

APPARENT          ACTUAL

MICROPROCESSOR CONTROLLED THERMOCOUPLE SIMULATOR SYSTEM

BACKGROUND OF THE INVENTION

The present invention relates to a system which is capable of generating an EMF equivalent to that generated by a thermocouple of a selected type at a selected temperature.

A thermocouple consists of a pair of wires, each made of a different type of metal, and having one set of ends joined together to form a sensing junction. The other set of ends of the wires terminate so that they are at the same, known temperature to form a reference junction. Wires are connected between the reference junction and a load such as an indicating meter or the input of other read-out or signal conditioning equipment. The wires which connect the reference junction and the load may be made of copper or of another type of metal different from the metals joined at the sensing junction.

Whenever the sensing junction and the reference junction of a thermocouple are at different temperatures, a current flows through the circuit due to the thermoelectric effect. The magnitude of the electromotive force (EMF) which causes the flow of current through the circuit is dependent on the type of metals which are joined to form the sensing junction, as well as on the temperatures of the sensing junction and the reference junction. Metals which are commonly used in thermocouples are CHROMEL (Trademark) and ALUMEL (Trademark), Constantan, Copper, Iron, Platinum, an alloy of Platinum and Rhodium, Tungsten, Tungsten-Rhenium alloys, Nickel, and Ferrous Nickel alloys. There are hundreds of types of thermocouples in use.

The characteristics of thermocouples made of different combinations of metals, such as their temperature versus EMF curves, their accuracy tolerances, and their wire insulation color codes, have been standardized by American National Standards Institute Standard C96.1. The ANSI Standard favors the use of typeletter designations in lieu of names of the two metals used in a particular thermocouple. For example, the following are typical thermocouple types: E (CHROMEL-/Constantan), J (Iron/Constantan), K (CHROMEL/ALUMEL) and T (Copper/Constantan). In National Bureau of Standards (NBS) Monograph 125, polynomials are specified which define the temperature versus EMF curves of the various standard thermocouple types.

Many temperature measuring devices, temperature control devices and other related devices are designed to be connected to thermocouples. Such devices need to be calibrated. Therefore, it is desirable to have a system which is capable of generating an EMF equivalent to that generated by a thermocouple of a selected type operated at a selected temperature. Furthermore, there exists a need for a system that will enable precise calibration of conventional DC measuring devices and thermocouples.

U.S. Pat. No. 3,504,522 of Jasik et al discloses a thermocouple system simulator including an operational amplifier having a DC current voltage source and a resistance bridge disposed in the feedback loop thereof. The resistance bridge includes in one leg thereof a device whose resistance varies with temperature. The feedback loop further includes a thermocouple.

A Model 1100 Thermocouple Simulator/Calibrator is commercially manufactured by Ectron Corporation of San Diego, Calif., the assignee of the subject application. Its output voltage is a succession of straight line segments which approximate type E, J, K or T thermocouple curves. The output voltage is generated by two multiplying DACs. Two of the DAC inputs are selected from ROM memory. A third DAC input is obtained directly from the setting of lever switches on the front panel of the device. The Model 1100 requires an oven assembly for maintaining reference junctions at a constant temperature. It further utilizes output terminals which are made of the actual metals and alloys of the various thermocouple types which are simulated.

SUMMARY OF THE INVENTION

Accordingly, it is the primary object of the present invention to provide a thermocouple simulator system which is capable of generating a voltage equivalent to the EMF output of a thermocouple of a selected type operated at a selected sensing junction temperature.

It is another object of the present invention to provide such a thermocouple simulator system which is microprocessor controlled.

Another object of the present invention is to provide a thermocouple simulator system which calculates an EMF output for a specified sensing junction temperature and thermocouple type utilizing a stored polynomial equation of the temperature versus EMF function for the particular thermocouple type.

Yet another object of the present invention is to provide a thermocouple simulator system of the aforementioned type which automatically adjusts its output voltage representing the simulated EMF to separately compensate for each thermocouple junction formed in attaching a connecting wire to each of its output terminals.

It is another object of the present invention to provide a thermocouple simulator system of the aforementioned type which can function as a precision DC power supply having a very low output impedance.

Finally, it is another object of the present invention to provide a thermocouple simulator system of the aforementioned type which can be remotely controlled to allow computer controlled operation.

The present invention provides a thermocouple simulator system which is capable of generating a voltage equivalent to the EMF output of a thermocouple of a selected type at a specified sensing junction temperature. The system includes a keyboard which allows an operator to specify a sensing junction temperature, voltage, thermocouple type, reference junction temperature, and whether a pair of output terminals of the system perform as thermocouple alloy or copper. Using an operation program, a microprocessor calculates the thermocouple EMF using a stored temperature versus EMF polynomial function of the selected thermocouple type. The microprocessor then causes a voltage simulating the calculated EMF to be applied to the output terminals utilizing a reference voltage source, DAC, and output amplifier. When the wires connected to the output terminals are made of a different metal than the terminals, signals from temperature sensors in the output terminals are fed to the microprocessor through an analog-to-digital converter. The microprocessor then offsets the voltage simulating the EMF output to compensate for the thermocouple junction formed in connecting the wires to the output terminals. The system may also operate as a precision DC power supply with extremely low output impedance.

DESCRIPTION OF THE PREFERRED EMBODIMENT

Figure 1:
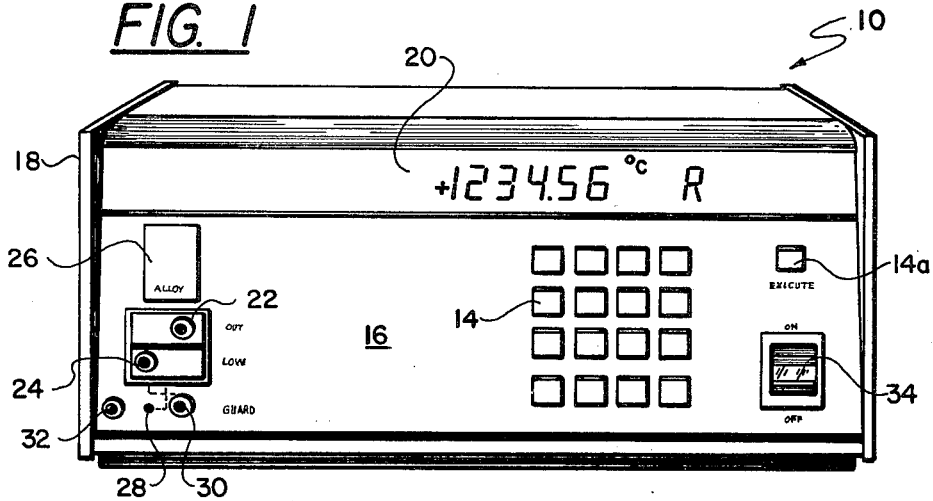
FIG. 1 is a perspective view of the front panel of a preferred embodiment of the thermocouple simulator system.

The preferred embodiment 10 (FIG. 1) of the thermocouple simulator system is controlled by a CPU 12 (FIG. 2) which may be an INTEL 8085A microprocessor. The microprocessor generates a 2.4576 MHz clock signal from a 4.9152 MHz crystal 13. The microprocessor handles data entry, calculation, and digital-to-analog conversion functions. Entry to embodiment 10 is through a seventeen key keyboard 14 (FIG. 1) which allows the operator to specify temperature in degrees C. or F., voltage in millivolts or volts, thermocouple type, and whether the output terminals perform as thermocouple alloy or copper. The operator can also specify, by depressing specific keys of the keyboard 14, any reference junction temperature in either degrees C. or F., over the range of the thermocouple type being used. The keyboard includes an execute key 14a that is spaced from the remaining sixteen keys of the keyboard. These sixteen keys are arranged in a four by four array.

The keyboard 14 (FIG. 1) is supported on the vertical front panel 16 of a cabinet 18. The electronic circuitry of the system is carried and interconnected on PC boards (not shown) which are mounted within the cabinet 18. Mounted on the front panel 16 of the cabinet above the keyboard 14 is an LED display 20 which indicates the simulation temperature or output voltage, unit of measure, the thermocouple type and that the reference junction temperature has been specified at other than zero degrees C. or thirty-two degrees F.

A pair of output terminals 22 and 24 (FIG. 1) are mounted on the left side of the front panel 16 of the cabinet. Above the output terminals is an additional LED display 26 which indicates the material to be connected to the terminals and output "NOT VALID" conditions. The display 26 (FIG. 1) includes three LED indicators which indicate the status of the terminals, namely ALLOY, COPPER, or NOT VALID. An ALLOY indication is displayed when the output terminals are totally compensated and appear as a thermocouple alloy material for the selected thermocouple type. A COPPER indication is displayed when the output terminals appear as standard copper material. A NOT VALID indication is displayed when a change in output is pending or an excessive load has been applied to the output terminals.

The output terminals 22 and 24 are isolated and guard shielded from the cabinet (power ground) and a remote control bus as hereafter described. A front panel switch 28 enables the guard to be tied to the output LOW terminal 24. A third front panel terminal 30 provides connection to the guard.

The guard terminal 30 is usually connected to the output LOW terminal 24 when there is no common voltage present between the device being calibrated and the thermocouple simulator system. The guard switch 28 is pulled out for this condition. If, however, a common mode voltage exists between the system and the device being calibrated, the guard terminal 30 should be driven by the common mode voltage and the switch 28 is pushed in to open the connection between the guard terminal and the output LOW terminal 24.

A power safety ground may be connected to the cabinet through a ground terminal 32. AC line voltage is connected and disconnected from the power supply 33 (FIG. 2) of the thermocouple simulator system by manual operation of an on-off switch 34 (FIG. 1) mounted on the front panel 16 beneath the execute key 14a.

A non-volatile memory in the form of a RAM 36 (FIG. 2) with eight memory registers permits storage and recall of seven sets of total operating conditions and one reference junction temperature. The operating conditions include simulation temperature or output voltage, thermocouple type, and the type of wire to be connected to the output terminals. An internal replaceable battery cell 37 provides power to the RAM 36 in the absence of AC line power. Any memory register can be recalled from the RAM for display without erasure. These memory registers provide the operator with the ability to store frequently used conditions of operation for execution at the simple push of several keys. The system includes two electronic switches (not illustrated) which insure retention of the contents of the RAM 36 (FIG. 2) when the power switch 34 (FIG. 1) is turned off and that the microprocessor is disabled until the voltages are adequate when the system is turned on.

Figure 2:
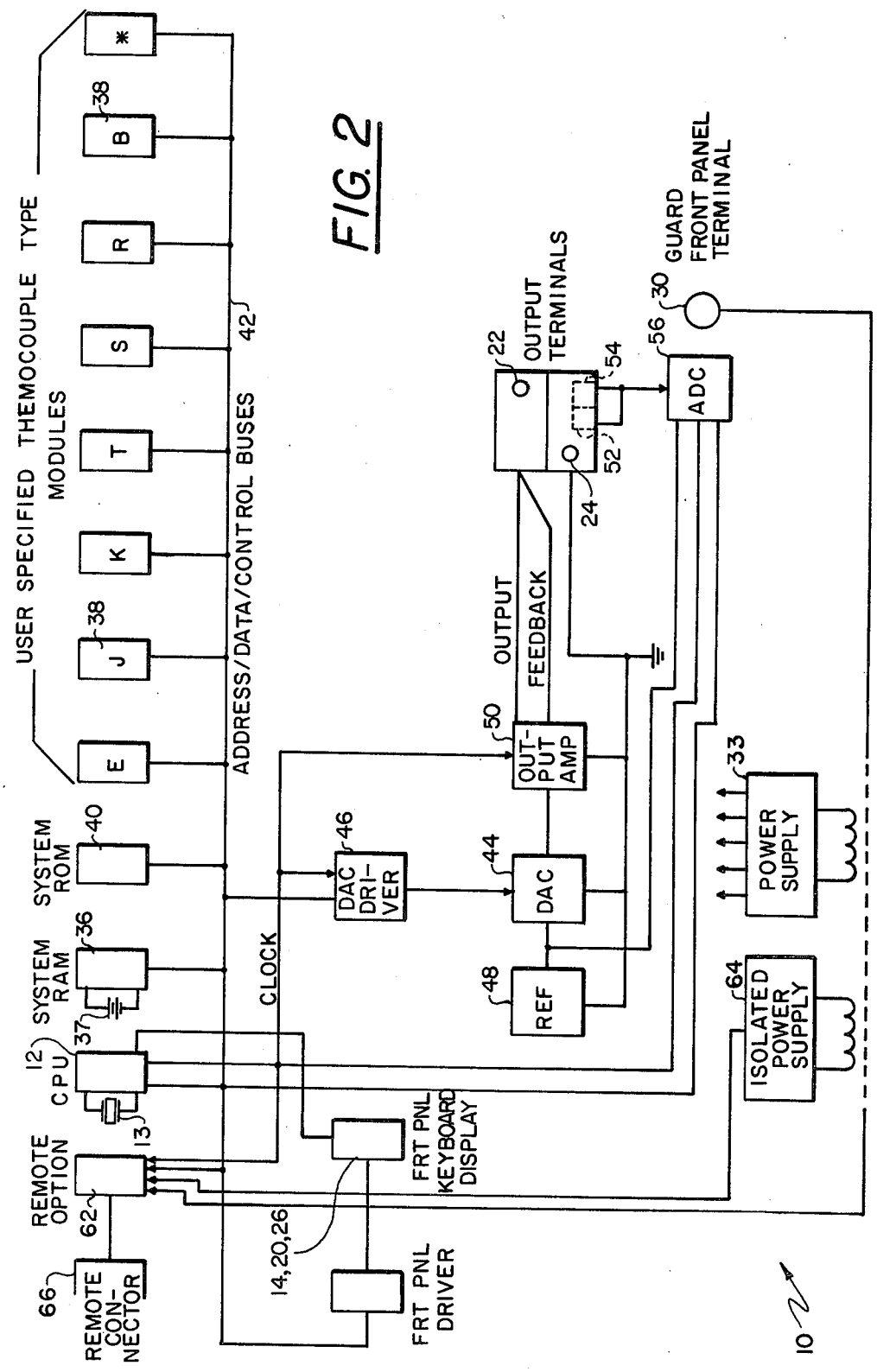
FIG. 2 is a functional block diagram of the preferred embodiment of the thermocouple simulator system.

The microprocessor 12 calculates thermocouple EMF's using polynomial equations that correspond to the NBS Monograph 125 standard for the various thermocouple types. The coefficients for these polynomials are stored in the E, J, K, T, S, R, B and * thermocouple type plug-in modules 38 (FIG. 2). The asterisk module represents any thermocouple type for which a polynomial function may be derived. Each of the thermocouple modules 38 includes a ROM for storing digital data representing the temperature versus EMF function $f(t) = V$ for a given thermocouple type and temperature. Calculations and performed by the microprocessor in thirty-two bit floating point arithmetic with an accuracy of plus or minus 1 uV.

The output terminals 22 and 24 are both gold-plated solid copper blocks that are electrically isolated but thermally connected to each other. Sensing elements are imbedded in each to provide continuous information to the microprocessor for use in compensation calculations. The temperature of each terminal is sensed and separate compensation is employed for each. In this manner, truly accurate outputs are obtained regardless of the thermal conditions and the thermocouple materials connected. Thus, the output terminals and the associated circuitry hereafter described have the unique ability to appear electrically as copper or any of the thermocouple alloy materials.

After the operator has entered the desired output conditions and presses the execute key 14a, the system operates in one of the following four modes:

(1) Thermocouple simulator, alloy output;
(2) Thermocouple simulator, copper output;
(3) Linear voltage, alloy output; or
(4) Linear voltage, copper output.

Figure 3A:
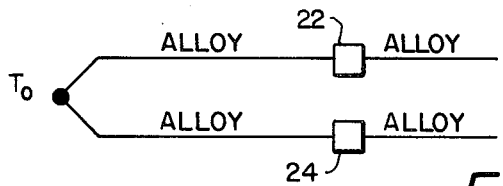
FIGS. 3a-3d are a series of diagrams illustrating the actual and apparent connections to the output terminals of the thermocouple simulator system of the present invention in each of its four basic modes of operation.
Figure 3A:
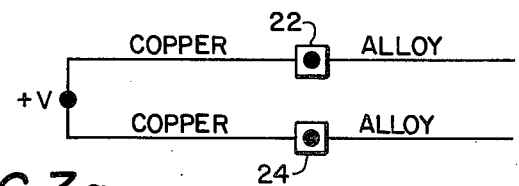

In the first mode listed above, the system looks like a thermocouple of the specified type at the simulation temperature specified. Although the output connections are made to copper blocks, the temperature of that junction is measured and the generated EMF is precisely compensated. FIG. 3a illustrates the apparent and actual connections to the system when it is used as a thermocouple source with alloy wires. The voltage $V = f(T_0) - f(T_B)$ where:

f is the temperature to voltage function for the thermocouple type used;

$T_0$ is the temperature selected by the operator; and $T_B$ is the measured temperature of the front panel output terminals.

Figure 3B:
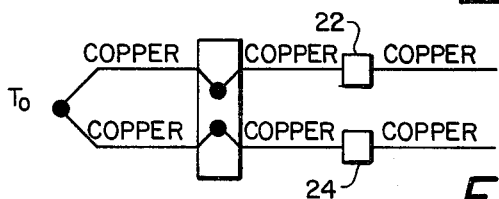
Figure 3B:
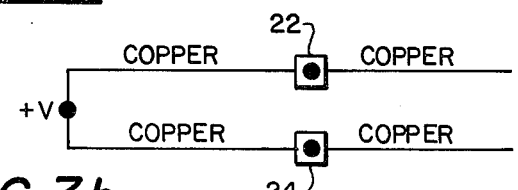

FIG. 3b illustrates the apparent and actual connections to the system when it is operated in its second mode as a thermocouple source with copper wires. The output voltage $V = f(T_0) - f(T_R)$ where $T_R$ is the stored reference junction temperature. In the second mode, the system looks to the user like the same thermocouple as in the first mode with a junction to copper at a temperature specified as the reference junction temperature.

Figure 3C:
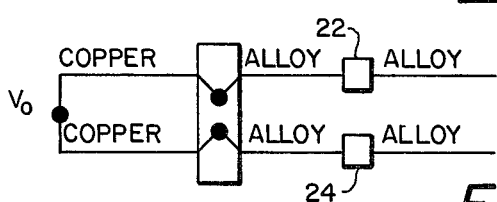
Figure 3C:
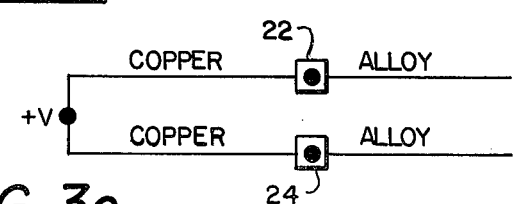

FIG. 3c illustrates the apparent and actual connections to the system when it is operated in its third mode as a millivolt or voltage source with alloy wires. The output voltage $V = V_0 + f(T_R) - f(T_B)$ where $V_0$ is the voltage selected by the operator. In the third mode, the system looks to the user as if the output is from the terminals composed of the thermocouple alloys specified by the thermocouple type.

Figure 3D:
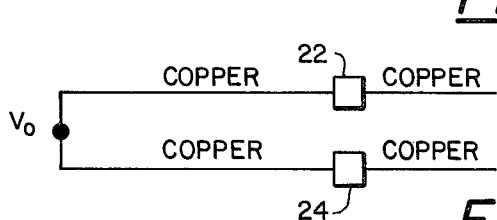

FIG. 3d illustrates the apparent and actual connections to the system when it is operated in its fourth mode as a millivolt or voltage source with copper wires. The output voltage V equals $V_0$. In the fourth mode, the system operates as a precision DC voltage source feeding copper output terminals.

Referring to FIG. 2, the illustrated embodiment of the thermocouple simulator system further includes memory means in the form of a ROM 40 for storing digital data representing an operation program for the system. An application to register a copyright claim in a one-hundred and seventy page source listing of a computer program for the preferred embodiment of the present invention was mailed to the Register of Copyrights, Library of Congress, Washington, D.C., 20559 on Mar. 24, 1982. A Certificate of Copyright Registration bearing Registration Number TXU 120-067 and an effective date of registration of Mar. 29, 1982, was subsequently issued on said application. A copy of the program is being filed with this patent application. The authors of the program are Michael F. Wells and Wesley R. Potterton. The program is entitled "1120 Thermocouple Simulator". The copyright in this program has been assigned by the authors to Ectron Corporation, the assignee of the subject patent application.

The aforementioned one-hundred and seventy page source listing of the computer program for the preferred embodiment of the thermocouple simulator system includes the source listing for the E, J, K, T, S, R and B thermocouple modules 38. In addition, the source listing contains the operation program for the system which is stored in the ROM 40. The aforementioned computer program is specifically incorporated herein by reference and forms a portion of the disclosure of the subject invention for purposes of meeting the requirements of 35 USC Section 112. Applicants hereby reserve the right to set out the entire computer program as part of the specification of this application in the event that the Commissioner of Patents and Trademarks deems the aforementioned incorporation by reference to be unacceptable.

Referring to FIG. 2, the microprocessor 12 communicates with the RAM 36, ROM 40 and the thermocouple modules 38 over address, data and control buses 42. The microprocessor calculates the thermocouple EMF's using the polynomial equations that correspond to NBS Monograph 125. The coefficients for these polynomials are stored in ROM memories in the plug-in modules 38. Each module is independent and can be installed and removed from any one of eight sockets.

Digital signals from the microprocessor representing the calculated thermocouple EMF's are applied to a digital-to-analog converter or DAC 44 through a DAC driver 46. A stable reference voltage, for example ten volts, from a reference source 48 feeds the DAC 44, which preferably is a twenty-one bit binary digital-to-analog converter. The output of the DAC 44 feeds an inverting output amplifier 50 having selectable gains of 1, $\frac{1}{8}$, and 1/128. The output of this amplifier is connected to the output terminals 22 and 24, which as previously indicated comprise two gold plated copper blocks. The gold plating prevents corrosion. A gold plated copper binding post, which forms an output terminal, is mounted in each one of the blocks. The blocks are electrically insulated, but are thermally coupled together. This may be done by compressing between the blocks a thin perforated sheet of non-conducting material impregnated with thermally conductive grease. The temperature of each of the blocks is measured by respective solid state temperature sensors 52 and 54 mounted within the blocks. The outputs of these sensors are averaged and the average is applied to the input of an analog-to-digital converter or ADC 56. The output of the ADC is fed to the microprocessor which, utilizing the operational program, offsets the output at the terminals 22 and 24 to compensate for the junctions formed in connecting the thermocouple wires to the copper output blocks. The temperature sensors 52 and 54 are not used when the system is operating in one of its COPPER modes.

Figure 4:
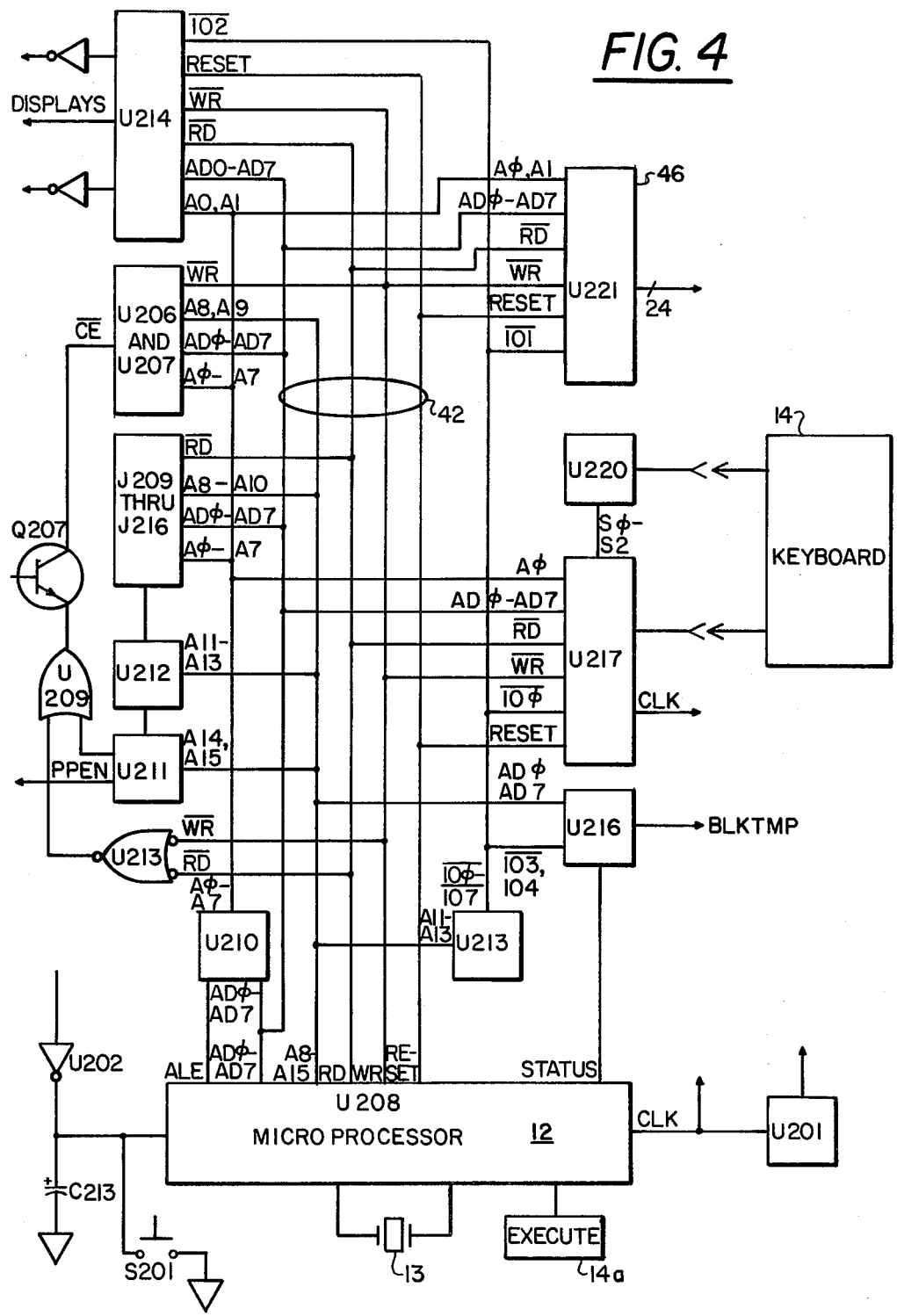
FIG. 4 is a simplified schematic diagram of the microprocessor interface circuitry in the preferred embodiment of the thermocouple simulator system.

FIG. 4 is a simplified schematic diagram illustrating further details of the interface circuitry associated with the microprocessor. A type MC14020B ripple-carry binary counter chip U201 divides the 2.4576 MHz clock signal by $2^{11}$(1/2048). This provides a 1.2 KHz pulse to operate a chopper in the analog portion of the system. A pair of CMOS RAMs U206 and U207 provide the non-volatile memory 36. This memory is used for storing digital data representing computations. In addition, this memory provides the eight memory registers for storage and recall of predetermined operating conditions and one reference junction temperature.

A type P8255A programmable peripheral interface chip U214 (FIG. 4) is used by the microprocessor to feed the front panel display. A type P8279-5 keyboard and display encoder chip U217 and a type 74LS138 decoder chip U220 provide the interface between the keyboard 14 and the microprocessor 12.

The DAC driver 46 (FIG. 2) preferably comprises an INTEL 8255A-5 DAC driver chip U221 (FIG. 4). The ADC 56 (FIG. 2) is preferably a type 7109CPL analog-to-digital converter chip U216 (FIG. 4). This chip is used to provide a digital output which is a function of the temperature of the output terminals 22 and 24.

A series of fifteen pin double read-out connectors J209 through J216 provide plug-in receptacles for the thermocouple modules 38 so that their contents can be read by the microprocessor 12. A type 74LS373 octal transparent latch chip U210 is used as a low order address latch. A type 74LS139 decoder chip U211 is used for line and address decoding. A type 74LS138 decoder/multiplexer chip U212 is used for address decoding to select a thermocouple module. The ROM 40 (FIG. 2) may comprise four separate ROM chips each containing 2,048 bytes. Thirteen address lines are used to select the ROM chip to be used and the required outputs. The address lines originate in the microprocessor and in the octal latch U210 (FIG. 4).

Figure 5:
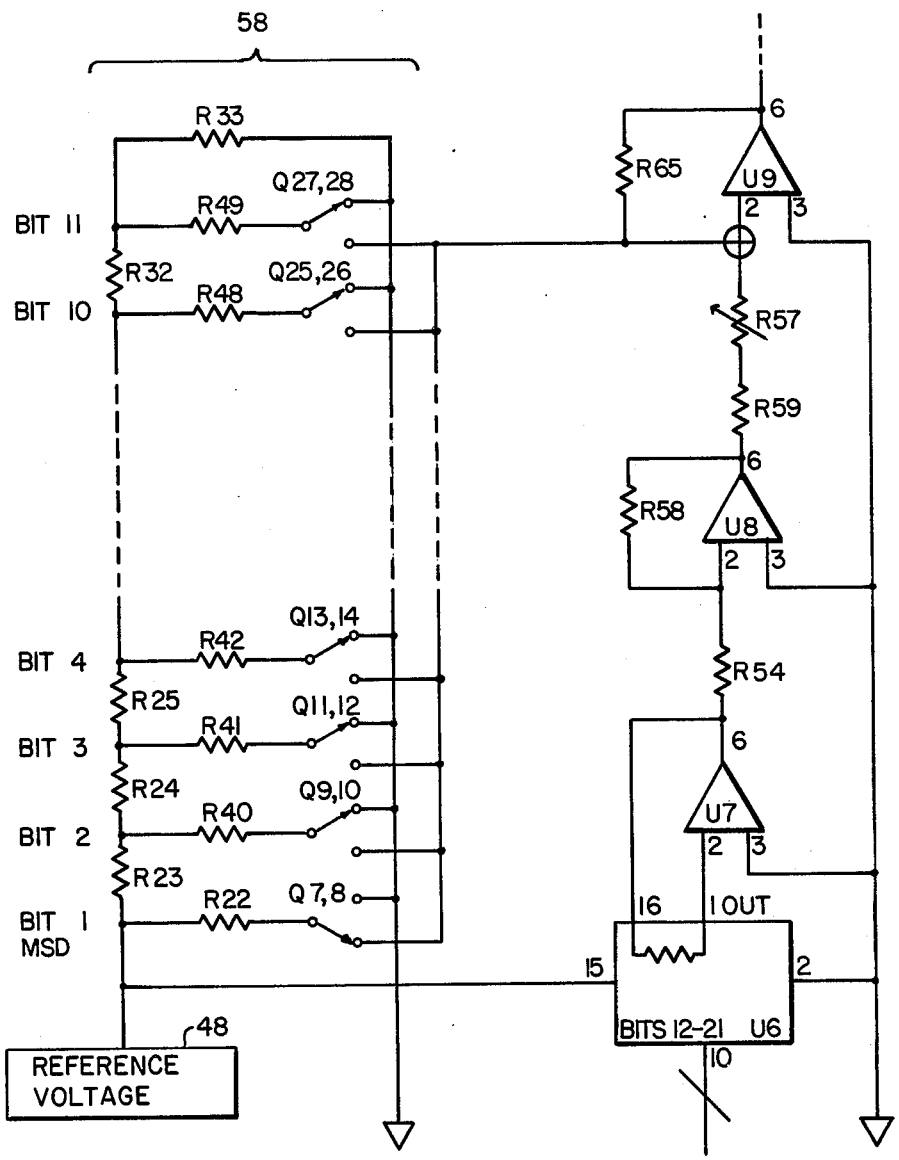
FIG. 5 is a simplified schematic diagram of the circuitry of the digital-to-analog converter (DAC) in the preferred embodiment of the thermocouple simulator system.

FIG. 5 is a simplified schematic diagram of the DAC 44. The output of the precision reference voltage source 48 is applied to one portion of the DAC 44 which preferably comprises a type AD7533LN CMOS D/A chip U6 which contributes the minor portion of the output voltage of the DAC 44. The output of the reference voltage source 48 is also applied to the remaining portion 58 of the DAC 44 which is made of discrete components. These include MOSFET pairs Q7, 8 through Q27, 28 which are illustrated in FIG. 5 as simple switches. An inverter (not illustrated) is used to insure that when one MOSFET of a pair is conducting, the other MOSFET is not conducting. The discrete portion 58 (FIG. 5) of the DAC 44 provides bits 1-11, while the integrated circuit portion U6 of the DAC 44 provides bits 12-21. The amplified output of the integrated circuit portion U6 and of the discrete portion 58 of the DAC 44 are applied to input terminal 2 of an operational amplifier U9 which sums the inputs. The other input terminal 3 of the operational amplifier U9 is connected to ground potential. The input terminal 2 of the operational amplifier U9 is held at ground potential by the current of opposite polarity through a resistor R65. When the MSB is on as illustrated in FIG. 5 by the position of the MOSFET switch Q7, 8, a current of approximately 1 mA flows through a resistor R22 to input terminal 2 of the operational amplifier U9. This current is opposed by a current flowing through the resistor R65. In the preferred embodiment, the output voltage of U9 is approximately 8.3886 volts for a current of 1 mA.

Twenty-one bits are applied to the DAC 44, eleven to the discrete portion 58 and ten to the integrated circuit portion U6. Table I hereafter sets forth the contribution of each of the DAC portions to the summing junction which is input terminal 2 of the op amp U9:

TABLE I

| BIT | DISCRETE PORTION OF DAC | BIT | INTEGRATED CIRCUIT PORTION OF DAC |
|---|---|---|---|
| 1 | 8.388608 V | 12 | 0.004096 V |
| 2 | 4.194304 | 13 | 0.002048 |
| 3 | 2.097152 | 14 | 0.001024 |
| 4 | 1.048576 | 15 | 0.000512 |
| 5 | 0.524288 | 10 | 0.000256 |
| 6 | 0.262144 | 17 | 0.000128 |
| 7 | 0.131072 | 18 | 0.000064 |
| 8 | 0.065536 | 19 | 0.000032 |
| 9 | 0.032768 | 20 | 0.000016 |
| 10 | 0.016384 | 21 | 0.000008 |
| 11 | 0.008192 | | |

The output of the discrete portion 58 (FIG. 5) of the DAC is connected directly to input terminal 2 of the op amp U9. However, the output of the integrated circuit portion U6 of the DAC, is reduced by the gain of a type LM741CN operational amplifier U8 (1/500) and a divider consisting of resistor R59, potentiometer R57 and resistor R65 (approximately 0.4). The reference voltage from the source 48 is applied to pin 15 of the integrated circuit digital-to-analog converter U6. The MSB of U6 is 512/1024 + the reference voltage, which in the case of a reference voltage of ten volts turns out to be five volts. This five volts output of the chip U6 is reduced by 1/500 and 0.4 and is approximately 4 mV.

In a similar manner, the LSB of the chip U6 (FIG. 5) is $1/1024 \times$ ten volts $\times 0.4 \times 1/500$ which yields approximately 8 uV. 8 uV multiplied by $2^{20}$ is approximately 8.388608 volts which is the MSB of the discrete portion 58 of the DAC 44. This is also the value of R65 in thousands of ohms.

Figure 6:
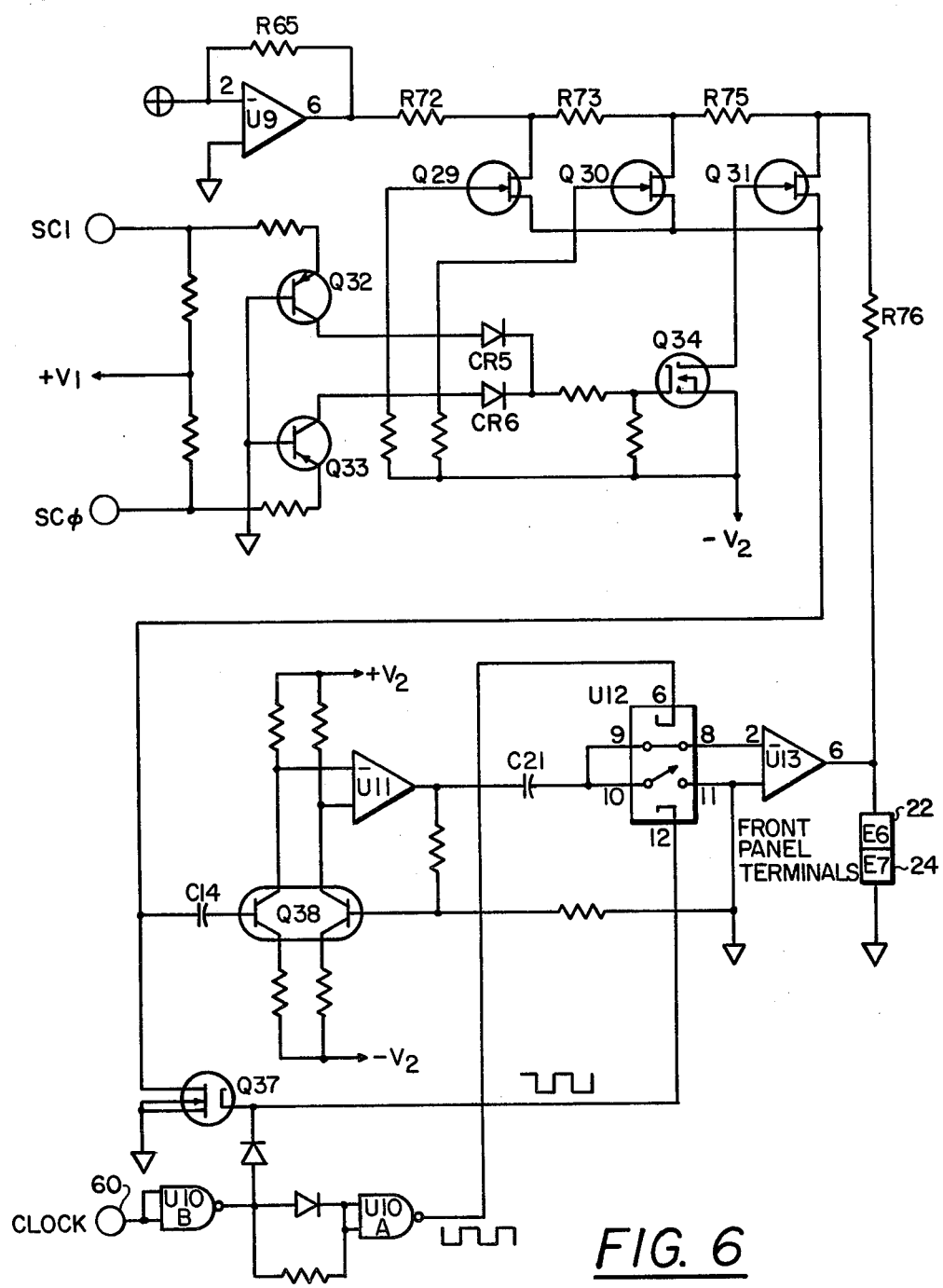
FIG. 6 is a simplified schematic diagram of the output amplifier of the preferred embodiment of the thermocouple simulator system.

FIG. 6 is a simplified schematic diagram of the output amplifier 50 of the preferred embodiment of the thermocouple simulator system. As already indicated, the outputs from the discrete and integrated portions of the DAC 44 are summed at the input terminal 2 of the operational amplifier U9. U9 is the input to the output amplifier 50. FETs Q29, Q30 and Q31, along with resistors R72, R73, R75, and R76 which are connected to the output of U9, provide a gain division of $-1$, $-8$, or $-128$. FET Q37, dual NPN transistor Q38, operational amplifiers U11 and U13, and bilateral switch U12 comprise a chopper amplifier. Op amp U11 may be a type HA72605-5, op amp U13 may be a type OP27GZ, and bilateral switch U12 may be a type CD4016AE. The output of op amp U13 drives the output terminal 22. The non-inverting input of the op amp U13 and the base of one of the transistors Q38 are connected to the other output terminal 24.

When the system is programmed for thermocouple temperature or a low millivolt source, the gain of the output and amplifier 50 illustrated in FIG. 6 is changed to reduce noise. Gain changes are accomplished by FET switches Q29, Q30 and Q31. When Q29 conducts, the gain is 1 (R73+R75+R76/R72). When Q30 conducts, the gain is ⅛ (R75+R76/R72+R73). When Q31 conducts, the gain is 1/128 (R76/R72+R73+R75). FETs Q29, Q30 and Q31 are controlled by levels at SC0 and SC1, and activate transistors Q32 and Q33. When the MOSFET Q34 conducts, Q31 is held off by a negative voltage on the gate. Q34 conducts when either Q32 or Q33 are conducting. In the preferred embodiment, $+V_1$ is +5 volts $+V_2$ is +15 volts and $-V_2$ is $-15$ volts.

Gates U10A and U10B buffer and shape the incoming clock signal received on lead 60 and provide two levels which differ by one-hundred eighty degrees. The chopping frequency is preferably approximately 1.2 KHz and is derived from the 4.9152 MHz crystal 13 after division by four thousand and ninety-six. The gates U10A and U10B may be provided by a type CD4011AE two input integrated circuit NAND chip.

MOSFET Q37 (FIG. 6) chops ay DC level appearing on capacitor C14 which provides a square wave referenced to ground at the input base of one of the transistors Q38. The square wave is amplified by this transistor and by the op amp U11 and is demodulated by chip U12. The resulting DC level again referenced to ground is applied to input terminal 2 of op amp U13. The output of this op amp is fed back to the input base of the other transistor Q38.

As previously indicated, the output terminals 22 and 24 (FIG. 2) are thermally connected but electrically isolated. The temperature sensors which are used to measure the temperature of the gold plated copper blocks comprising the output terminals may comprise plastic versions of LM 324 devices. These devices are powered by the reference voltage source 48 (FIG. 2) and their outputs are paralleled and applied to the analog-to-digital converter 56 which is chip U216 in FIG. 4. The outputs of U216 are applied to the microprocessor which calculates the reference junction compensation required.

Figure 7:
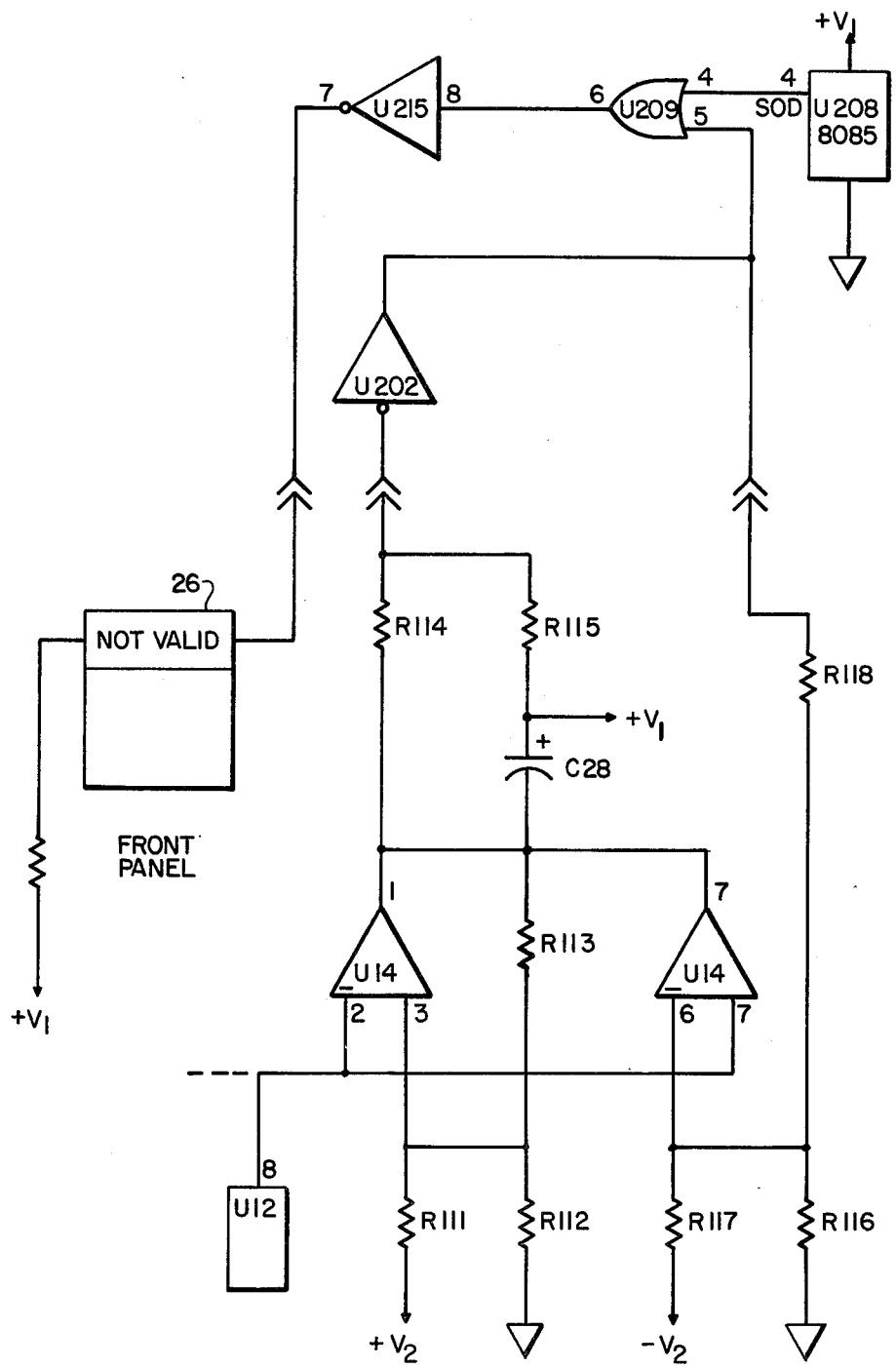
FIG. 7 is a simplified schematic diagram of the output amplifier overload sensing circuit and the circuit for sensing when the microprocessor is computing in the preferred embodiment of the thermocouple simulator system.

FIG. 7 is a simplified schematic diagram of an output amplifier overload sensing circuit incorporated in the preferred embodiment of the thermocouple simulator system. A NOT VALID indicator in the display 26 (FIG. 1) is illuminated when either the output amplifier 50 (FIG. 2) is overloaded or the microprocessor is computing a new output voltage. Referring to FIG. 7, the voltage at pin 8 of the demodulator chip U12 is zero when no overload is present. The voltage is also zero at pin 4 of the microprocessor U208 (FIG. 4) when it is not computing a new output voltage.

Dual comparators U14 (FIG. 7) have outputs of approximately five volts in the absence of an overload condition and the NOT VALID indicator is extinguished. The dual comparators U14 are preferably provided by a type LM393N device. A resistive divider comprising resistors R11 and R12 connected to input terminal 3 of one of the comparators U14 and a resistive divider comprising resistors R17 and R16 connected to input terminal number 6 of the comparitor U14 force the outputs of these comparators to +5 volts when no overload condition is present at pin 8 of the demodulator chip U12. When the voltage at pin 8 of this demodulator chip exceeds approximately + or −2 volts, one comparitor output is low, the output of amplifier U202 is high, the output of gate U209 is high and the output of inverter U215 is low. When the output of inverter 215 is low, the NOT VALID front panel indicator is illuminated.

In FIG. 7, $+v_1$ is approximately +5 volts, $+V_2$ is approximately +15 volts, and $-v_2$ is approximately −15 volts. The serial output data (SOD) at pin 4 of the microprocessor U208 is zero when the microprocessor is not computing, and is +5 volts when it is computing a new output voltage. Pin 4 of the microprocessor is connected to the OR gate 209. The output of this OR gate U209 is high and the sequence continues as just described.

The illustrated embodiment of the thermocouple simulator system incorporates a self-test diagnostic feature which checks several hardware and software functions for proper operation. The test is performed automatically when the system is turned on. The test can be initiated at any time by depressing two of the keys on the front panel. The test can also be initiated by remote command. Three separate tests are performed in the following order:

(1) LED segment test;

(2) checksum and longitudinal redundancy check of all thermocouple module ROMs; and (3) checksum and longitudinal redundancy check of operational program ROMs.

When the self-test diagnostic routine is initiated either automatically or manually, all LED segments and all sections of the front panel indicators are illuminated for a brief time interval to allow any failures to be readily observed. The system then advances to the second of the three tests. If a failure should occur, FAIL 2 is displayed for a limited period of time. The system then advances to the third one of the three tests. If a failure should occur, FAIL 3 is displayed for a limited period of time. The system then reverts to operational status at the conclusion of the test sequence.

A remote option circuit 62 (FIG. 2) and an isolated power supply 64 may be provided to enable the system to function both as a listener and a talker to a host computer system via a remote connector 66. This connector may take the form of an IEEE-488 Interface. Optical-isolators may provide complete isolation between the thermocouple simulator system and the bus grounds.

As indicated above, the preferred embodiment of the thermocouple simulator system can operate as a precision DC voltage source. The high levels of accuracy in this mode of operation of the system permit the calibration of a wide variety of DC measuring instruments, such as digital volt meters, recorders and data systems. In the preferred embodiment, voltages between −11 and +11 volts may be selected with resolution to 0.01 microvolts. The circuitry of the system enables extremely low output impedances at the output terminals to be achieved, for example. 0.05 ohms or less. This permits the calibration of instruments with low or varying input impedance.

The operator may enter any reference junction temperature within the temperature range of the thermocouple module in use. This eliminates the need for laborous calculations which were previously required in those systems utilizing ambient or other reference junction temperatures. The system automatically compensates and provides the precise output voltage.

In order to preserve the microvolt accuracy of the system, the analog section including the reference voltage source 48, DAC 44 and output amplifier 50, is totally isolated from the cabinet 18, AC power line and the remote connector 66. Extensive shielding in the system including a box shielded transformer in the power supply 33 allows the system to accept the ground system of the instrument being calibrated without introducing ground loop currents.

Having described a preferred embodiment of the thermocouple simulator system, it should be apparent to those skilled in the art that our invention may be modified in arrangement and detail.

The system capabilities could be extended to include temperature measurement. This may be done by attaching the reference junction of a thermocouple to the terminals 22 and 24 and by adding switching means and a comparator between the output amplifier and the terminals. The EMF output of the thermocouple could be read by the microprocessor, which would then calculate the unknown temperature based on the stored polynomial function for that thermocouple type. This temperature measurement capability enables the precise calibration of a thermocouple by placing its sensing junction in a known temperature bath and noting the temperature displayed.

The system could be further modified to enable it to make temperature readings of extremely high accuracy using an inexpensive thermocouple having relatively poor accuracy. The reference junction of the thermocouple would be attached to the terminals 22 and 24 of the system. The system would then be placed in an appropriate operating mode via keyboard 14. The sensing junction of the thermocouple would be successively immersed in at least two temperature baths having differing known temperatures. The system could then register the EMF output from the thermocouple for each bath, and the known temperatures corresponding to each of these outputs would be inputted into the system. Using the polynomial in the thermocouple module for the corresponding type of thermocouple, the system would then generate calibration data for the thermocouple. In effect, the system would recalibrate itself to precisely match the uncalibrated thermocouple. The sensing junction of the inexpensive thermocouple could then be placed in a bath or other environment at an unknown temperature, and the system could calculate the unknown temperature using the calibration data.

In view of the above, the protection afforded our invention should be limited only in accordance with the scope of the following claims.

We claim:

1. A thermocouple simulator system comprising:
   a pair of output terminals;
   means, including a computer processing unit, for inputting to the unit, selected data designating a selected thermocouple type, a sensing junction simulation temperature, a reference junction temperature for the selected thermocouple type and a type of output terminal metal;
   means for storing a plurality of temperature versus EMF polynomial functions that each characterize an EMF of a corresponding one of a plurality of thermocouple types, the coefficients of the polynomial functions being stored in ROM memory detachable units;
   means for calculating a value of EMF output for the inputted thermocouple type at the inputted simulation temperature for the inputted output terminal metal and inputted reference junction temperature using the stored temperature versus EMF polynomial function of the inputted thermocouple type; and
   means for generating and applying to the output terminals a voltage representative of the calculated value of EMF, and for sensing the temperature of each of the output terminals and offsetting the voltage applied to the output terminals to compensate for the thermocouple junctions formed in connecting wires to the terminals.

2. A thermocouple simulator system according to claim 1 and further comprising:
   means for electrically isolating the output terminals from each other; and
   means for thermally coupling the output terminals together.

3. A thermocouple simulator according to claim 1 and further comprising:
   means for sensing when an excessive load has been applied to the output terminals; and
   means for providing an indication of the excessive load.

4. A thermocouple simulator system according to claim 1 and further comprising:
   display means for indicating the simulation temperature, thermocouple type, and type of output terminal metal.

5. A thermocouple simulator system according to claim 1 and further comprising:
   means for providing communication between the system and a remote computer while providing electrical isolation therebetween.

6. A thermocouple simulator system according to claim 1 and further comprising means connected to the microprocessor for storing a plurality of operating conditions which can be recalled by operation of the input means.

7. A thermocouple simulator system according to claim 1 and further comprising:
   means for specifying a DC voltage; and
   means for generating at the output terminals the DC voltage with an output impedance of 0.05 ohms or less.

8. A thermocouple simulator system according to claim 1 and further comprising:
   means for determining the temperature of the sensing junction of a thermocouple having its reference junction connected to the output terminals; and
   display means for providing an indication of the temperature.

9. A thermocouple simulator system according to claim 1 wherein the detachable units for storing the polynomial functions are removable modules.

10. A thermocouple simulator system according to claim 1 and further comprising:
    means for generating calibration data for a predetermined type of thermocouple having its reference junction connected to the terminals by comparing a plurality of EMF outputs of the thermocouple when its sensing junction is at a plurality of known temperatures and by comparing the EMF outputs to the corresponding temperature versus EMF function of the corresponding type of thermocouple;
    means for thereafter determining an unknown temperature of the sensing junction using the calibration data; and
    means for providing an indication of the unknown temperature.

11. A thermocouple simulator system comprising:
    means for inputting to the system, selected data designating a sensing junction simulation temperature, a thermocouple type, a terminal metal type, and a reference junction temperature and for generating digital signals representative thereof;
    first memory means for storing digital data representing a plurality of temperature versus EMF polynomial functions that each characterize an EMF of a corresponding one of a plurality of thermocouple types, the coefficients of the polynomial functions being stored in ROM memory detachable units;

second memory means for storing digital data representing an operation program;

third memory means for storing digital data representing computations;

a microprocessor coupled to the input means, first memory means, second memory means and third memory means for calculating a value of EMF corresponding to the inputted data designating the sensing junction simulation temperature, the thermocouple type, the terminal metal type, and the reference junction temperature utilizing the operation program and the corresponding polynomial function, and for generating a digital signal representative of the calculated value of EMF;

digital-to-analog converter means for receiving the digital signal representing the calculated value of EMF and outputting a voltage representative thereof;

a pair of terminals for having the voltage output of the digital-to-analog converter means applied thereto;

means for sensing the temperature of the terminals and for producing an analog signal representative thereof;

analog-to-digital converter means for receiving the analog signal and supplying the microprocessor with a digital signal representative of the temperature of the terminals; and wherein the microprocessor adjusts the digital signal representing the calculated value of EMF to compensate for thermocouple junctions formed in attaching the connecting wires to the terminals.

* * * * *